US010836348B1

(12) United States Patent
Papworth et al.

(10) Patent No.: US 10,836,348 B1
(45) Date of Patent: Nov. 17, 2020

(54) MOBILE VEHICLE INTEGRATION WITH A HOME AUTOMATION SYSTEM

(71) Applicant: Vivint, Inc., Provo, UT (US)

(72) Inventors: Michael Richard Papworth, Eagle Mountain, UT (US); Michael Joseph Thompson, Eagle Mountain, UT (US); Janelle Kim Seegmiller, Seattle, WA (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 16/240,693

(22) Filed: Jan. 4, 2019

Related U.S. Application Data

(60) Provisional application No. 62/614,245, filed on Jan. 5, 2018.

(51) Int. Cl.
| | |
|---|---|
| *B60R 25/102* | (2013.01) |
| *B60R 25/104* | (2013.01) |
| *B60R 25/33* | (2013.01) |
| *B60R 25/04* | (2013.01) |
| *B60R 25/20* | (2013.01) |
| *H04L 12/28* | (2006.01) |
| *B60R 25/10* | (2013.01) |

(52) U.S. Cl.
CPC ...... *B60R 25/2018* (2013.01); *H04L 12/2827* (2013.01); *H04L 12/2834* (2013.01); *B60R 2025/1016* (2013.01)

(58) Field of Classification Search
CPC .................................................. B60R 25/2018
See application file for complete search history.

(56) References Cited

U.S. PATENT DOCUMENTS

| | | | | |
|---|---|---|---|---|
| 2004/0239482 | A1* | 12/2004 | Fitzgibbon | G08C 17/00 340/5.61 |
| 2008/0033603 | A1* | 2/2008 | Gensler | B62D 15/0285 701/1 |
| 2009/0146846 | A1* | 6/2009 | Grossman | B60R 25/04 340/988 |
| 2010/0271193 | A1* | 10/2010 | Gonzaga | E05F 15/00 340/457 |
| 2014/0309789 | A1* | 10/2014 | Ricci | H04W 4/40 700/276 |
| 2015/0293509 | A1* | 10/2015 | Bankowski | G05B 15/02 700/275 |
| 2017/0108873 | A1* | 4/2017 | Tanaka | B60W 30/18009 |

* cited by examiner

*Primary Examiner* — Joseph H Feild
*Assistant Examiner* — Pameshanand Mahase
(74) *Attorney, Agent, or Firm* — Holland & Hart, LLP

(57) ABSTRACT

Methods, systems, and devices for wireless communication are described. In one example, a method for mobile vehicle integration with a home automation system is described, the method including detecting, at the home automation system, an event associated with a mobile vehicle integrated with the home automation system. The method also includes performing, by the home automation system, an action related to the detected event.

18 Claims, 9 Drawing Sheets

MOBILE VEHICLE INTEGRATION WITH A HOME AUTOMATION SYSTEM

CROSS REFERENCE TO RELATED APPLICATIONS

This application claims priority to U.S. Provisional Patent Application No. 62/614,245 entitled "Mobile Vehicle Integration with a Home Automation System" which was filed Jan. 5, 2018, which is incorporated by reference herein.

BACKGROUND

The present disclosure, for example, relates to security and/or automation systems, and more particularly to mobile vehicle integration with a home automation system.

Security and automation systems are widely deployed to provide various types of communication and functional features such as monitoring, communication, notification, and/or others. These systems may be capable of supporting communication with a user through a communication connection or a system management action.

Many properties, such as homes or business locations, have security and/or automation systems that covers the premises, including any buildings on the premises. However, the security or automation systems do not extend to mobile vehicles that leave and return to the premises. Vehicles may have their own security and automation systems, such as car alarms and remote starting with a separate system, but they may often be inadequate. These vehicle systems are not integrated with the home security and/or automation system.

SUMMARY

Functionality and features of a home security and/or automation system may be extended to mobile vehicles that enter and exit a premises associated with the home security and/or automation system. Systems onboard a vehicle can be controlled through a home security system. For example, a user of the home security and/or automation system can instruct changes to be made to the vehicle. Also the home security and/or automation system can initiate changes to be made to the vehicle automatically based on sensor data and previous instructions.

Information may be exchanged between the home security and/or automation system and the mobile vehicle. The home security and/or automation system may use its sensors to monitor the mobile vehicle when the mobile vehicle is located within its geographical region. The home security and/or automation system may leverage sensors onboard the mobile vehicle to monitor it, particularly when the mobile vehicle is located outside the reach of sensors of the home security and/or automation system. The home security and/or automation system may detect an event at the mobile vehicle and take an action related to the event.

A method of mobile vehicle integration with a home automation system is described. The method may include detecting, at the home automation system, an event associated with a mobile vehicle integrated with the home automation system and performing, by the home automation system, an action related to the detected event.

An apparatus for mobile vehicle integration with a home automation system is described. The apparatus may include means for detecting, at the home automation system, an event associated with a mobile vehicle integrated with the home automation system. The apparatus may also include means for performing, by the home automation system, an action related to the detected event.

Another apparatus for mobile vehicle integration with a home automation system is described. The apparatus may include a processor, memory in electronic communication with the processor, and instructions stored in the memory. The instructions may be operable to cause the processor to detect, at the home automation system, an event associated with a mobile vehicle integrated with the home automation system. The instructions may be further operable to perform, by the home automation system, an action related to the detected event.

A non-transitory computer-readable medium for mobile vehicle integration with a home automation system is described. The non-transitory computer-readable medium may include instructions operable to cause a processor to detect, at the home automation system, an event associated with a mobile vehicle integrated with the home automation system and perform, by the home automation system, an action related to the detected event.

Some examples of the method, apparatus, and non-transitory computer-readable medium described above may further include processes, features, means, or instructions for providing, by the home automation system, a notification to a device associated with the home automation system regarding at least one of the event or the action performed.

Some examples of the method, apparatus, and non-transitory computer-readable medium described above may further include processes, features, means, or instructions for determining a current location of the mobile vehicle. Some examples may include determining, from the current location of the mobile vehicle, that the mobile vehicle may be approaching a property associated with the home automation system, wherein the event may be the determination that the mobile vehicle may be approaching the property, and wherein performing the action at the home automation system includes adjusting one or more aspects of the home automation system based on the determination that the mobile vehicle may be approaching the property.

Some examples of the method, apparatus, and non-transitory computer-readable medium described above may further include processes, features, means, or instructions for determining a current location of the mobile vehicle. Some examples may further include processes, features, means, or instructions for determining, from the current location of the mobile vehicle, that the mobile vehicle may be outside a threshold distance from a property associated with the home automation system. Performing the action at the home automation system may include setting the home automation system to an away mode based on the determination that the mobile vehicle may be outside the threshold distance from the property.

Some examples of the method, apparatus, and non-transitory computer-readable medium described above may further include processes, features, means, or instructions for determining that the mobile vehicle is parked. Some examples described here may further include processes, features, means, or instructions for detecting a movement of the mobile vehicle while it may be parked, wherein the event may be the movement of the mobile vehicle. The action performed by the home automation system may include providing a notification to a device associated with the home automation system that the mobile vehicle may have moved.

Some examples of the method, apparatus, and non-transitory computer-readable medium described above may further include determining that the mobile vehicle may be parked at a property associated with the home automation system. Some examples of the described here may further include processes, features, means, or instructions for monitoring the mobile vehicle with one or more sensors of the home automation system, wherein detecting the movement of the mobile vehicle may be based on data from the one or more sensors.

Some examples may also predict a cause of the movement from the detected movement of the mobile vehicle. Some examples may further include processes, features, means, or instructions for providing a notification indicating the predicted cause of the movement. Additional examples may further include processes, features, means, or instructions for receiving, at the home automation system, an indication of the event from the mobile vehicle.

Some examples may further include receiving, at the home automation system, a request for the mobile vehicle to be locked or unlocked, wherein the event may include the receiving the request. The action related to the detected event may include locking or unlocking the mobile vehicle according to the request. The detected event may include detecting a security breach of the mobile vehicle. In such an example, the action related to the detected event may include at least one of arming the home automation system or notifying a designated entity of the security breach.

Some examples of the method, apparatus, and non-transitory computer-readable medium described above may further include processes, features, means, or instructions for receiving, at the home automation system, an instruction to arm the home automation system, wherein the event associated with the mobile vehicle may include the instruction to arm the home automation system. The action performed may include arming a security system of the mobile vehicle.

Some examples of the method, apparatus, and non-transitory computer-readable medium described above may further include processes, features, means, or instructions for receiving data from one or more sensors onboard the mobile vehicle. Some examples including analyzing the data from the one or more sensors to determine the event may have occurred.

In some examples of the method, apparatus, and non-transitory computer-readable medium described above, the action performed includes changing a setting of one or more devices onboard the mobile vehicle.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

Functionality and features of a home security and/or automation system may be extended to mobile vehicles associated with the home security and/or automation system (simply referred to herein as a home automation system). The home automation system may detect an event at the vehicle and take an action related to the event. The home automation system may detect the event at the vehicle by monitoring the vehicle via one or more sensors or receiving input from a user. The home automation system may integrate with the mobile vehicle and may cause it to take an action when the detected event warrants. Otherwise, the home automation system may take an action separate from the mobile vehicle.

Example functionality that may be provided by integrating a home automation system with a vehicle include improved security of both the vehicle and the home, improved adjustments of the home automation system, more efficient emergency response, improved communications, improved fuel efficiency, improved safety, and an improved user experience.

The home automation system may take actions previously defined by a user or by a cloud service for any given event. For example, the home automation system may call a roadside assistance service identified by the user and provide the user's identification number and location in response to detecting that the vehicle has broken down or gotten a flat tire. As another example, the home automation system may turn on specific lights and change an oven temperature setting when the vehicle is arriving within a threshold distance of the premises. Many other examples of improved functionality with the integrated systems are described herein.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
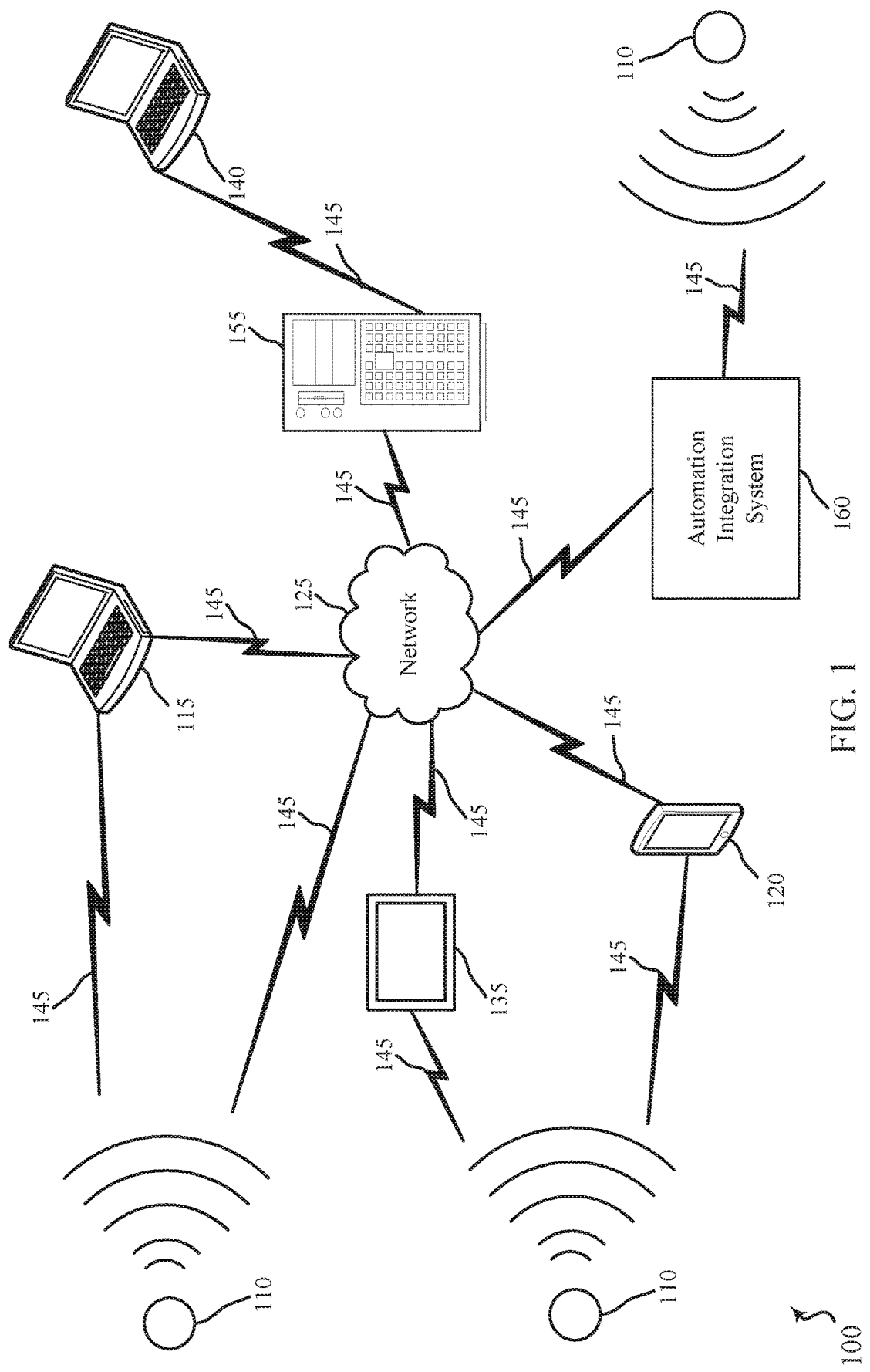
FIG. 1 illustrates an example of a system that supports mobile vehicle integration with a home automation system in accordance with aspects of the present disclosure.

FIG. 1 is an example of a home automation system 100 in accordance with various aspects of the disclosure. In some embodiments, the home automation system 100 may include one or more sensor units 110, local computing device 115, 120, network 125, server 155, control panel 135, remote computing device 140, and automation integration system 160. One or more sensor units 110 may communicate via wired or wireless communication links 145 with one or more of the local computing device 115, 120, network 125, or automation integration system 160. The network 125 may communicate via wired or wireless communication links 145 with the control panel 135 and the remote computing device 140 or automation integration system 160 via server 155. In alternate embodiments, the network 125 may be integrated with any one of the local computing device 115, 120, server 155, automation integration system 160, or remote computing device 140, such that separate components are not required.

The home automation system 100 may be operable to both control aspects of a property as well as to receive and display notifications regarding monitored activity of a property. Examples of the home automation system 100 may include a dedicated home automation computing device (e.g., wall-mounted controller), a personal computing device (e.g., laptop, desktop, etc.), a mobile computing device (e.g., tablet computing device, smartphone, etc.), and the like.

The home automation system 100 may have a boundary that separates an area that the home automation system 100 monitors and controls from an area that it does not monitor or control. For example, the boundary of the home automation system 100 may be the perimeter of a property or building into which the home automation system 100 is incorporated. In some examples, the home automation system 100 may have an internal boundary, where the home automation system 100 monitors and controls an inner portion of a property that is monitored and controlled. The inner portion of a property may include a garage or driveway, or any street surrounding the property. For example, the boundary may be the perimeter of a building while the home automation system 100 also monitors and/or controls at least some of the grounds around the building. In another example, the boundary may be one or more rooms within a monitored building (e.g., a secured laboratory or storage room, a personal bedroom, and the like). A user or administrator of the home automation system 100 may define one or more boundaries of the home automation system 100. Doors, windows, and other means of egress and ingress to a building or an area within a building may be monitored as part of the boundary of the home automation system 100.

Local computing devices 115, 120, automation integration system 160, and remote computing device 140 may be custom computing entities configured to interact with sensor units 110 via network 125, and in some embodiments, via server 155. In other embodiments, local computing device 115, 120, automation integration system 160, and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules. In other examples, the local computing device 115, 120, automation integration system 160, and remote computing device 140 may be systems, or parts of systems, integrated within home or vehicle security and/or automation systems.

The control panel 135 may be a smart home system panel, for example, an interactive panel mounted on a wall in a user's home. The control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 155, automation integration system 160, and network 125. In other examples, the control panel 135 may be a smart vehicle system panel, for example, an interactive panel mounted on a dashboard of a user's vehicle.

The local computing devices 115, 120 may include memory, a processor, an output, a data input and a communication module. The processor may be a general purpose processor, a Field Programmable Gate Array (FPGA), an Application-Specific Integrated Circuit (ASIC), a digital signal processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 or the automation integration system 160 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 155.

In some embodiments, the one or more sensor units 110 may be sensors configured to conduct periodic or ongoing automatic measurements related to mobile vehicle integration with a home automation system. Each sensor unit 110 may be capable of sensing multiple home and vehicle system parameters, or alternatively, separate sensor units 110 may monitor separate home or vehicle parameters, such as parameters related to a building, a group of buildings, a property, any other type of structure, or a vehicle. Examples of the sensor units 110 may include any one or more of a camera sensor, audio sensor, forced entry sensor, shock sensor, proximity sensor, boundary sensor, appliance sensor, light fixture sensor, temperature sensor, light beam sensor, three-dimensional (3-D) sensor, motion sensor, smoke sensor, glass break sensor, door sensor, window sensor, carbon monoxide sensor, accelerometer, global navigation satellite system (GNSS), such as a global positioning system (GPS), sensor, Wi-Fi positioning system sensor, capacitance sensor, chemoreceptor, odor sensor, infrared sensor, radio frequency sensor, near-field sensor, pressure sensor, seismic sensor, radar sensor, LIDAR sensor, heartbeat sensor, breathing sensor, oxygen sensor, carbon dioxide sensor, brain wave sensor, voice sensor, and the like.

For example, one sensor unit 110 may measure occupancy in a room of a premises, while another sensor unit 110 (or, in some embodiments, the same sensor unit 110) may detect motion of a mobile vehicle in a driveway of the premises. In some embodiments, one or more sensor units 110 may additionally monitor alternate parameters, such as position, tire pressure, fluid status, glass break, acceleration, orientation, temperature, speed, occupancy, presence of mobile computing devices, or the like. Sensor units 110 may monitor a variety of aspects of a home automation system or different aspects related to a mobile vehicle. In alternate embodiments, a user may input home or vehicle data directly at the local computing device 115, 120, the automation integration system 160, or at remote computing device 140. For example, a user may enter data into a dedicated application on their smart phone indicating a request or something related to the home or vehicle.

Data gathered by the one or more sensor units 110 may be communicated to local computing device 115, 120 and the automation integration system 160, which may be, in some embodiments, a thermostat or other wall-mounted input/output smart home display. In other embodiments, local computing device 115, 120 and the automation integration system 160 may be a personal computer or smart phone. Where local computing device 115, 120 or the automation integration system 160 is a smart phone, the smart phone may have a dedicated application directed to collecting home or vehicle data and calculating information therefrom. The local computing device 115, 120 and the automation integration system 160 may process the data received from the one or more sensor units 110 to obtain information related to one or more systems of the home or vehicle. In alternate embodiments, remote computing device 140 may process the data received from the one or more sensor units 110, via network 125 and server 155, to obtain information related to one or more systems of the home or vehicle. Data transmission may occur via, for example, frequencies appropriate for a personal area network (such as BLUETOOTH® or IR communications) or local or wide area network frequencies such as radio frequencies specified by the IEEE 802.15.4 standard.

In some embodiments, local computing device 115, 120 and the automation integration system 160 may communicate with remote computing device 140 or control panel 135 via network 125 and server 155. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 or the automation integration system 160 from remote computing device 140. For example, in some embodiments, remote computing device 140 may include a mobile application that interfaces with one or more functions of local computing device 115, 120 or the automation integration system 160. In alternate embodiments, the network 125 may be integrated with the remote computing device 140 or the automation integration system 160, such that separate components are not required. The network 125 may also communicate, or be part of, a network-based cloud system.

The server 155 may be configured to communicate with the sensor units 110, the local computing devices 115, 120, the automation integration system 160, the remote computing device 140, and the control panel 135. The server 155 may perform additional processing on signals received from the sensor units 110, local computing devices 115, 120, or the automation integration system 160, or may simply forward the received information to the remote computing device 140 and control panel 135.

Server 155 may be a computing device operable to receive data streams (e.g., from sensor units 110 and/or local computing device 115, 120, remote computing device 140, or automation integration system 160), store and/or process data, and/or transmit data and/or data summaries (e.g., to remote computing device 140). For example, server 155 may receive a stream of sensor data from a sensor unit 110, a stream of sensor data from the same or a different sensor unit 110, and a stream of sensor data from either the same or yet another sensor unit 110. The sensor data may be related to one or more parameters of a mobile vehicle. In some embodiments, server 155 may "pull" the data streams, e.g., by querying the sensor units 110, the local computing devices 115, 120, the automation integration system 160, and/or the control panel 135. In some embodiments, the data streams may be "pushed" from the sensor units 110 and/or the local computing devices 115, 120 to the server 155. For example, the sensor units 110 and/or the local computing device 115, 120 or automation integration system 160 may be configured to transmit data as it is generated by or entered into that device. In some instances, the sensor units 110 and/or the local computing devices 115, 120 may periodically transmit data (e.g., as a block of data or as one or more data points).

The server 155 may include a database (e.g., in memory) containing sensor data received from the sensor units 110 and/or the local computing devices 115, 120. Additionally, as described in further detail herein, software (e.g., stored in memory) may be executed on a processor of the server 155. Such software (executed on the processor) may be operable to cause the server 155 to monitor, process, summarize, present, and/or send a signal associated with resource usage data.

The automation integration system 160 may be an automation system installed in a vehicle and integrated with one or more sensors 110 onboard the vehicle. A vehicle may be any mobile vehicle such as an automobile, boat, aircraft, motorcycle, carriage, buggy, bicycle, or the like. The automation integration system 160 may integrate with the home automation system 100. Integrating these systems may refer to interoperability between one or more aspects of a home automation system with one or more sensors and control systems on a vehicle. Interoperability may include exchanging data, including sensor data, requesting and sending such data, requesting or sending instructions, monitoring one system with components of the other, monitor activity, sharing processing power, sending notifications, informing third parties of information related to the systems, and the like.

FIG. 1 illustrates an example of a swim diagram 100 that supports mobile vehicle integration with a home automation system in accordance with various aspects of the present disclosure. The swim diagram 100 includes a home automation system 100-*a*, a vehicle integration system 160-*a*, and a mobile device 120-*a*. The home automation system 100-*a*, vehicle integration system 160-*a*, and mobile device 120-*a* may be examples of one or more aspects of a home automation system 100, a vehicle integration system 160, and a mobile device 120 as described in FIG. 1, respectively.

The home automation system 100-*a* may monitor a vehicle at block 205. The home automation system 100-*a* may monitor the vehicle directly with sensors in direct connection with the home automation system 100-*a*, such as with one or more cameras. Alternatively, or in addition, the home automation system 100-*a* may monitor the vehicle indirectly through one or more sensors onboard the vehicle. For example, if the vehicle is located within the premises of the home automation system 100-*a* (e.g., parked in a driveway), the home automation system 100-*a* may monitor the vehicle using sensors. The home automation system 100-*a* may also monitor the vehicle by receiving sensor date about the vehicle from the vehicle integration system 160-*a*.

At block 210, the vehicle integration system 160-*a* instructs sensor data to be captured or processes already captured sensor data. The sensor data may be captured from sensors associated with or onboard the vehicle, stored in a memory onboard the vehicle, or uploaded to the vehicle integration system 160-*a*. In some examples, the vehicle integration system 160-*a* is onboard the vehicle. In other examples, the vehicle integration system 160-*a* may be located in the cloud and connect to a processor or one or more sensors onboard the vehicle. In other examples, the vehicle integration system 160-*a* is part of the home automation system 100-*a* and integrates the vehicle with the home automation system 100-*a*. The vehicle integration system 160-*a* captures and/or processes the sensor data and then provides the sensor data 215 to the home automation system 100-*a*.

Using the sensor data 215 from the vehicle integration system 160-*a* and any directly monitored data, the home automation system 100-*a* may detect an event associated with the vehicle at block 220. The event may be determined from processing the sensor data. For example, the home automation system 100-*a* may detect a change in the sensor data, such as a sudden movement that may indicate the vehicle was impacted (e.g., a car crash), a tire has gone flat, the interior of the vehicle has reached a temperature threshold, a window of the vehicle has been broken, the vehicle accelerated, the vehicle is approaching or leaving the premises associated with the home automation system 100-*a*, the vehicle has been locked or unlocked, or the like.

At block 225, the home automation system 100-*a* may perform an action related to the event. An action may be initiated at the home automation system 100-*a* or at the vehicle integration system 160-*a*. For example, if the home automation system 100-*a* determines from the sensor data that the vehicle is approaching the premises, the home automation system 100-*a* may cause a garage door to open. Similarly, if the home automation system 100-*a* determines from the sensor data that the vehicle is leaving the premises, the home automation system 100-*a* may be set to an away status (e.g., a security system may be armed, heating and cooling systems may be altered for energy savings, lights in the premises turned off, and the like).

In some examples, the home automation system 100-*a* may be directly informed by a user of the home automation system 100-*a* regarding a status of the vehicle. Thus, the home automation system 100-*a* may detect the event associated with the vehicle from a user directly. In some cases, the user may even instruct the home automation system 100-*a* regarding with action to take in response to the detected event.

Other examples of a detected event may include glass of the vehicle breaking, a high temperature threshold being reached (e.g., overheated car), a low temperature threshold being reached, carbon monoxide in the passenger compartment detected, lights left on, an accident, a sudden acceleration, a flat tire, an engine problem or failure (e.g., overheating, broken belt, low oil or fuel, etc.), an occupant left in the vehicle, the vehicle approaching or leaving a certain location, the identities of occupants in the vehicle, leaving a mobile computing device in the vehicle, the vehicle is being stolen, the vehicle is being towed, the vehicle has been bumped, the vehicle being remotely started or turned off, the vehicle being parked at a location, the vehicle being locked or unlocked, a security system of the vehicle being armed or unarmed, etc.

The home automation system 100-*a* may take an action related to the event at block 225. For example, the home automation system 100-*a* may provide an instruction to the vehicle integration system 160-*a* in response to the event, such as instructions to turn on or off a light, start or turn off an engine, provide a notification to a driver of the vehicle (e.g., a flat tire or low oil alert), arm or disarm an alarm system, lock or unlock the vehicle, and the like. In other examples, the home automation system 100-*a* may perform an action at the premises of the home automation system 100-*a*. For example, the home automation system 100-*a* may turn on or off lights, raise or lower a temperature of the premises, open or close a door, arm or disarm a system, etc.

The home automation system 100-*a* may provide the vehicle integration system 160-*a* with a notification of the action or the detected event. The vehicle integration system 160-*a* may process the information regarding the action or the detected event and may cause a change to happen at the vehicle. The vehicle integration system 160-*a* may provide a driver or other user with a notification regarding the event or action. The home automation system 100-*a* may provide the mobile device 120-*a* with a notification of the action or the detected event. In some examples, the home automation system 100-*a* may provide a notification of the action or the detected event at a control panel of the home automation system 100-*a*.

Figure 2:
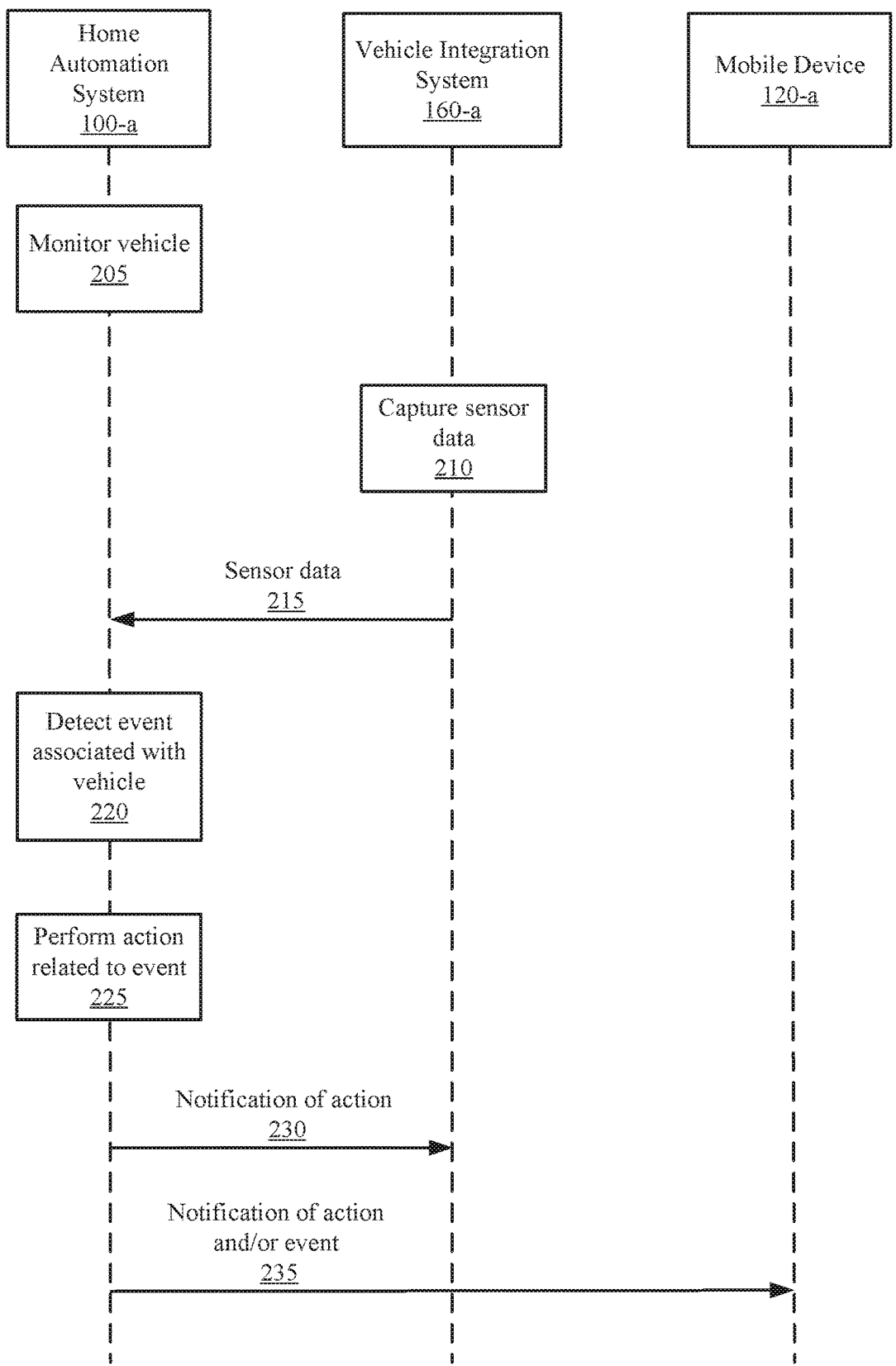
FIGS. 2 through 3 illustrate examples of a swim diagram that supports mobile vehicle integration with a home automation system in accordance with aspects of the present disclosure.

FIG. 2 illustrates an example of a swim diagram 200 that supports mobile vehicle integration with a home automation system in accordance with various aspects of the present disclosure. The swim diagram 200 includes a home automation system 100-*b*, a vehicle integration system 160-*b*, and a mobile device 120-*b*. The home automation system 100-*b*, vehicle integration system 160-*b*, and mobile device 120-*b* may be examples of one or more aspects of the home automation system 100, vehicle integration system 160, and mobile device 120 as described in FIGS. 1 and 2, respectively.

Figure 3:
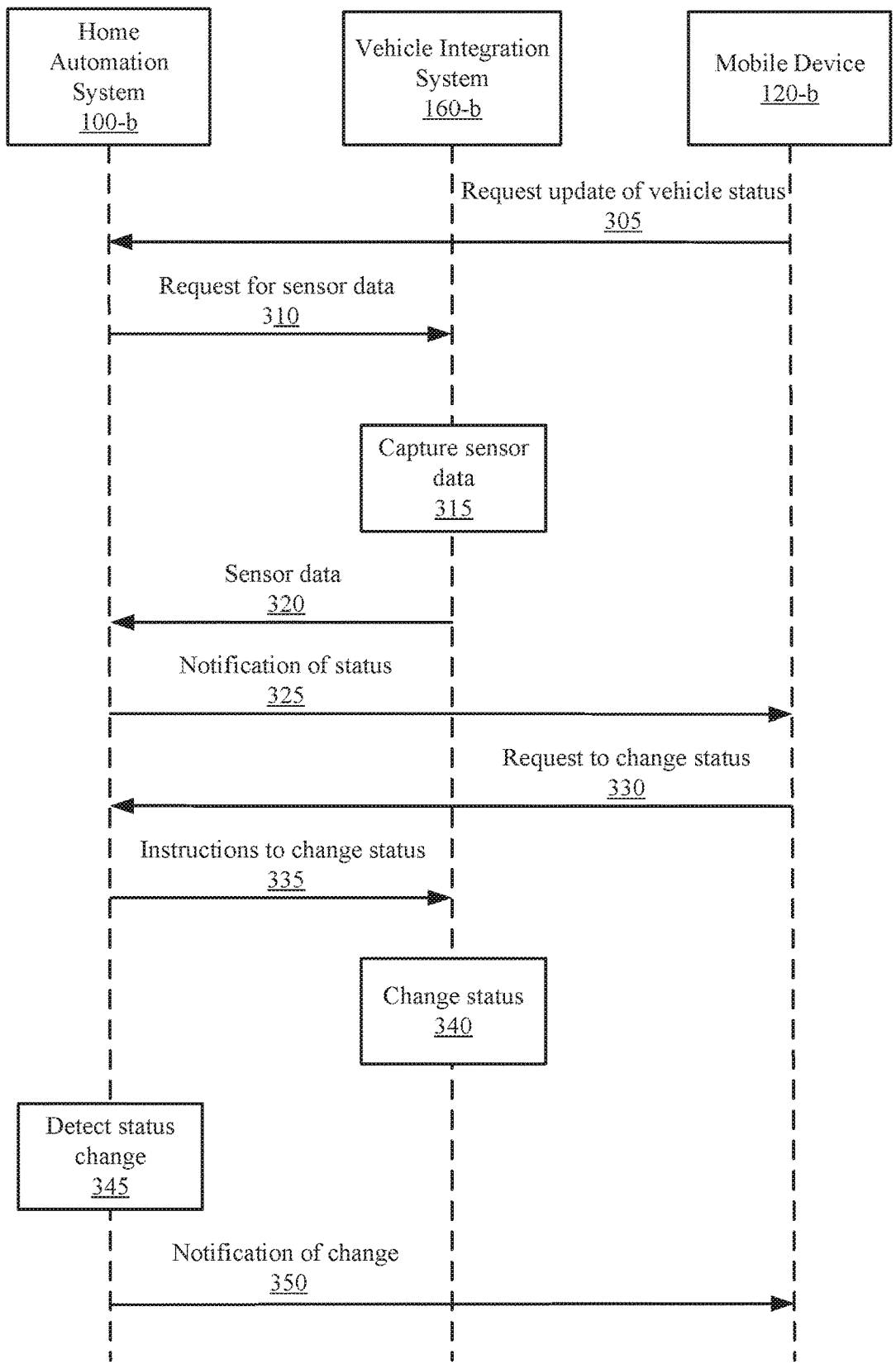

In the example of FIG. 3, a user requests an update for a vehicle status from the home automation system 100-*b* using the mobile device 120-*b*. The mobile device 120-*b* sends a request for an update of vehicle status 305 to the home automation system 100-*b*. In other examples, a control panel of the home automation system 100-*a* may be used for this purpose. The home automation system 100-*b* may send a request for sensor data to the vehicle integration system 160-*b*.

The vehicle integration system 160-*b* may capture the requested sensor data at 215. In some examples, the vehicle integration system 160-*b* has already captured the relevant sensor data. The vehicle integration system 160-*b* provides the sensor data 320 to the vehicle integration system 160-*b*. The vehicle integration system 160-*b* may process the sensor data and provide a notification of a status 325 to the mobile device 120-*b* or to a control panel of the home automation system 100-*b*. The notification may indicate, for example, that the vehicle is arriving home or work, departing work or home, at a specific location, at a specific temperature (e.g., engine or interior), being towed, likely in an accident, has a dead battery, needs maintenance, an altitude, a velocity, a speed, a security status, an occupancy, or the like.

The mobile device 120-*b* may request a status change to the vehicle from the home automation system 100-*b*. For example, the user may want their car unlocked and started. The user provides a request for the car to be started and unlocked to the home automation system 100-*b*. The home automation system 100-*b* provides instructions to change the status 335 to the vehicle integration system 160-*b*. The vehicle integration system 160-*b* may interprets the instructions and change the status at block 340. In the unlocked and started example, the vehicle integration system 160-*b* may cause the engine to start and the doors to be unlocked.

The home automation system 100-*b* may detect that the status has changed, either from the vehicle integration system 160-*b* itself or from observation (e.g., a camera detects an exhaust cloud from the vehicle parked in the driveway). The home automation system 100-*b* may provide the mobile device 120-*b* (or a control panel) with a notification of change 350.

Figure 4:
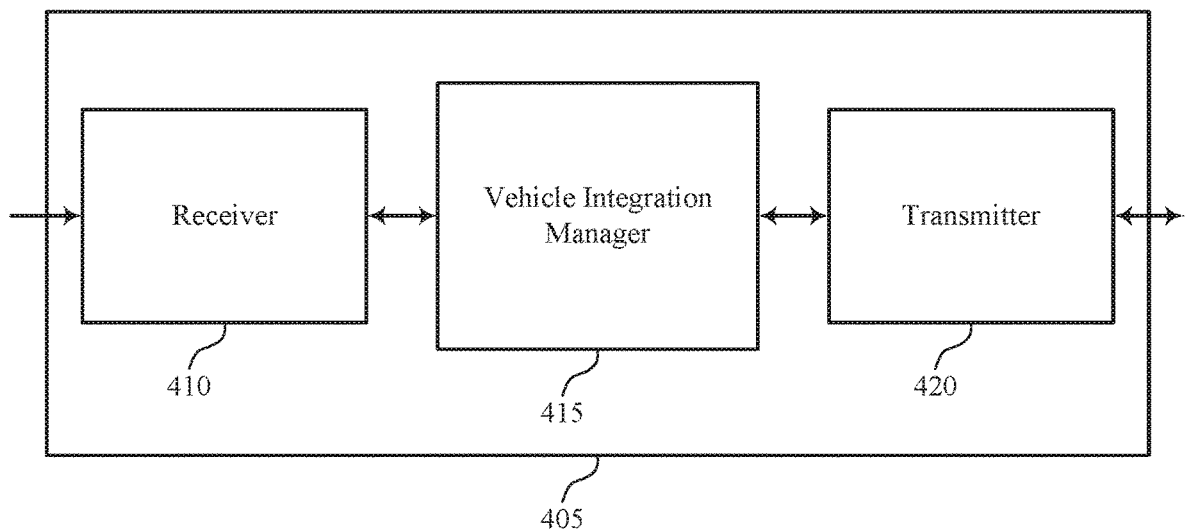
FIGS. 4 through 6 show block diagrams of a device that supports mobile vehicle integration with a home automation system in accordance with aspects of the present disclosure.

FIG. 4 shows a block diagram 400 of a device 405 that supports mobile vehicle integration with a home automation system in accordance with aspects of the present disclosure. Device 405 may be an example of aspects of a system vehicle integration system 160 as described herein. Device 405 may include receiver 410, vehicle integration manager 415, transmitter 420, and vehicle integration manager 455. Device 405 may also include a processor. Each of these components may be in communication with one another (e.g., via one or more buses).

Receiver 410 may receive information such as packets, user data, sensor data, or control information associated with various information channels (e.g., control channels, data channels, sensor data, instructions, and information related to mobile vehicle integration with a home automation system, etc.). Information may be passed on to other components of the device. The receiver 410 may be an example of aspects of the transceiver 735 described with reference to FIG. 7. The receiver 410 may utilize a single antenna or a set of antennas.

Receiver 410 may receive an indication of the event from the mobile vehicle. The receive data receiver 410 may also receive data from one or more sensors onboard the mobile vehicle. The receiver 410 may also receive requests for an action to be taken, such as a request for the mobile vehicle to be locked or unlocked. For examples, the event includes receiving the request, and the action related to the detected event includes locking or unlocking the mobile vehicle according to the request.

Vehicle integration manager 415 may be an example of aspects of the vehicle integration manager 715 described with reference to FIG. 7.

Vehicle integration manager 415 and/or at least some of its various sub-components may be implemented in hardware, software executed by a processor, firmware, or any combination thereof. If implemented in software executed by a processor, the functions of the vehicle integration manager 415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The vehicle integration manager 415 and/or at least some of its various sub-components may be physically located at various positions, including being distributed such that portions of functions are implemented at different physical locations by one or more physical devices. In some examples, vehicle integration manager 415 and/or at least some of its various sub-components may be a separate and distinct component in accordance with various aspects of the present disclosure. In other examples, vehicle integration manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Vehicle integration manager 415 may detect, for example via a home automation system, an event associated with a mobile vehicle integrated with the home automation system and perform, by the home automation system and the vehicle integration system, an action related to the detected event.

Transmitter 420 may transmit signals generated by other components of the device. In some examples, the transmitter 420 may be collocated with a receiver 410 in a transceiver module. For example, the transmitter 420 may be an example of aspects of the transceiver 735 described with reference to FIG. 7. The transmitter 420 may utilize a single antenna or a set of antennas.

Vehicle integration manager 425 may detect an event associated with a mobile vehicle integrated with the home automation system. The vehicle integration manager 425 may analyze the data from the one or more sensors to determine the event has occurred. For example, the event may be that the mobile vehicle is approaching a premises associated with the home automation system. The vehicle integration manager 425 may determine, from the current location of the mobile vehicle, that the mobile vehicle is approaching a property associated with the home automation system. In this example, performing the action at the home automation system includes adjusting one or more aspects of the home automation system based on the determination that the mobile vehicle is approaching the property.

In another example, the event may be that the mobile vehicle is departing a premises associated with the home automation system. determine, from the current location of the mobile vehicle, that the mobile vehicle is outside a threshold distance from a property associated with the home automation system. In this example, performing the action at the home automation system includes setting the home automation system to an away mode based on the determination that the mobile vehicle is outside the threshold distance from the property.

In another example, the event may be the detection of a movement of the mobile vehicle while it is parked. The home automation system may perform an action of providing a notification to a device associated with the home automation system that the mobile vehicle has moved, predict a cause of the movement from the detected movement of the mobile vehicle. In some cases, the action performed includes changing a setting of one or more devices onboard the mobile vehicle. The vehicle integration manager 425 and the home automation system may perform any of the examples described herein.

Figure 5:
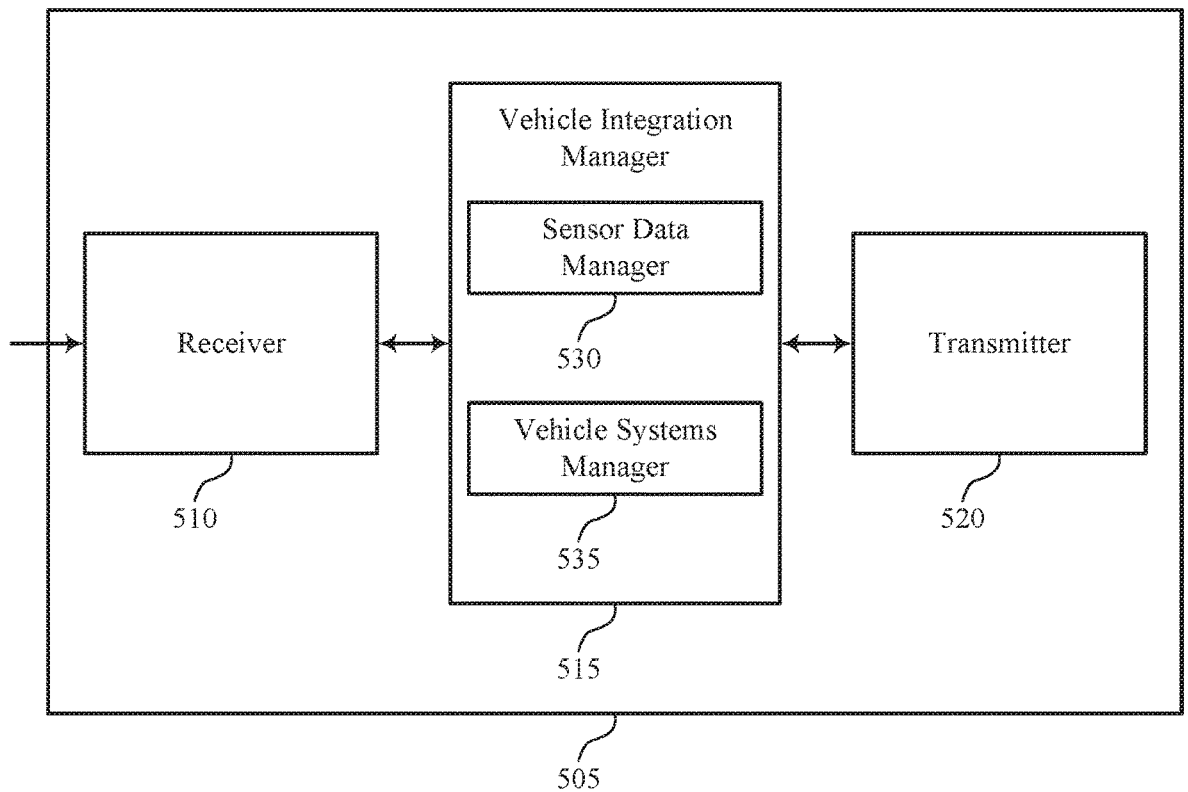

FIG. 5 shows a block diagram 500 of a device 505 that supports mobile vehicle integration with a home automation system in accordance with aspects of the present disclosure. Device 505 may be an example of aspects of a device 405 or a home automation system 100 as described with reference to FIGS. 1-4. Device 505 may include receiver 510, vehicle integration manager 515, transmitter 520, and vehicle integration manager 555. Device 505 may also include a processor. Each of these components may be in communication with one another (e.g., via one or more buses).

Receiver 510 may receive information such as packets, user data, sensor data, instructions, or control information associated with various information channels (e.g., control channels, data channels, and information related to mobile vehicle integration with a home automation system, etc.). Information may be passed on to other components of the device. The receiver 510 may be an example of aspects of the transceiver 735 described with reference to FIG. 7. The receiver 510 may utilize a single antenna or a set of antennas.

Vehicle integration manager 515 may be an example of aspects of the vehicle integration manager 715 described with reference to FIG. 7.

Vehicle integration manager 515 may also include sensor data manager 530 and vehicle systems manager 535. Vehicle integration manager 515 may integrate instructions and data between a vehicle and a home automation system. The vehicle integration manager 515 may process data captured by the home automation system and provide it to systems onboard the vehicle, and vice-versa. The sensor data manager 530 may capture, store, and process sensor data for sensors onboard the vehicle. The sensor data manager 530 may provide the sensor data or related information to the vehicle integration manager 530. The vehicle systems manager 535 may create and follow instructions regarding different systems of a vehicle. The different systems may include heating and cooling, engine systems, audio systems, camera systems (e.g., backup cameras), security systems, and the like.

The home automation system, via the vehicle integration manager 530, may detect an event associated with a mobile vehicle integrated with the home automation system and determine an action to take based on the event. For example, the vehicle integration manager 530 may provide one or more current locations of the mobile vehicle to the home automation system. This may inform the home automation system that the mobile vehicle is leaving or approaching the premises. Based on this, the home automation system may adjust one or more aspects of the home automation system based on the determination that the mobile vehicle is approaching or leaving the property. For example, the home automation system may prepare the home or business for the user's arrival or may set the home automation system to an away mode based on the determination that the mobile vehicle is outside the threshold distance from the property.

For example, the vehicle integration manager 530 may detect a movement of the mobile vehicle while it is parked. The home automation system may provide a notification to a device associated with the home automation system that the mobile vehicle has moved, predict a cause of the movement from the detected movement of the mobile vehicle, and analyze the data from the one or more sensors to determine the event has occurred. In some cases, the action performed includes changing a setting of one or more devices onboard the mobile vehicle. That is, the home automation system may perform, using information from the sensor data and via the vehicle systems manager 535, an action related to the detected event.

Transmitter 520 may transmit signals generated by other components of the device. In some examples, the transmitter 520 may be collocated with a receiver 510 in a transceiver. For example, the transmitter 520 may be an example of aspects of the transceiver 735 described with reference to FIG. 7. The transmitter 520 may utilize a single antenna or a set of antennas.

Figure 6:
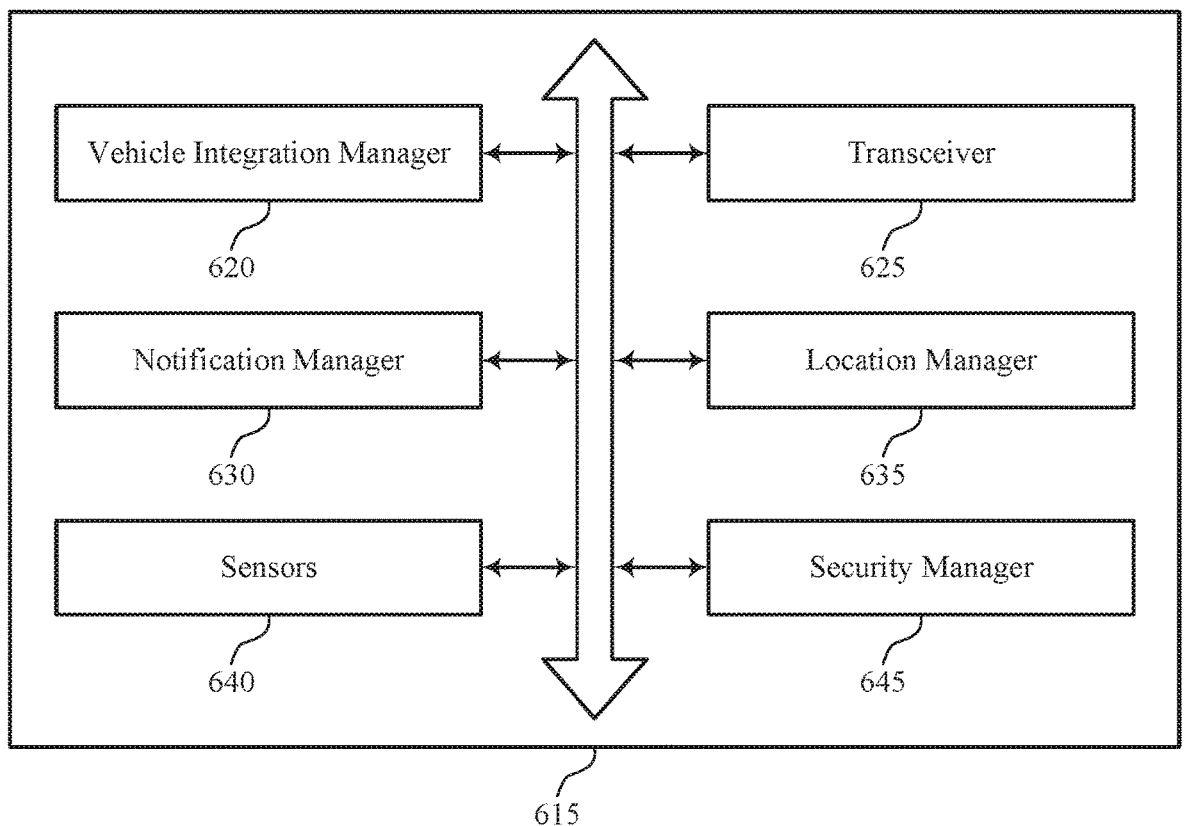

FIG. 6 shows a block diagram 600 of a vehicle integration system 615 that supports mobile vehicle integration with a home automation system in accordance with aspects of the present disclosure. The vehicle integration system 615 may be an example of aspects of a vehicle integration manager 415, a device 505, or a vehicle integration manager 715 described with reference to FIGS. 4, 5, and 7. The vehicle integration system 615 may include vehicle integration manager 620, transceiver 625, notification manager 630, location manager 635, sensor 640, and security manager 645. Each of these modules may communicate, directly or indirectly, with one another (e.g., via one or more buses).

Vehicle integration manager 620, in conjunction with a home automation system 100, may detect an event associated with a mobile vehicle integrated with the home automation system and determine an action to take based on the event. The home automation system may cause the perform vehicle integration manager 620 to take an action related to the detected event.

Notification manager 630 may provide a notification to the home automation system or a device associated with the home automation system regarding at least one of the event or the action performed and provide a notification indicating the predicted cause of the event.

Location manager 635 may determine a current location of the mobile vehicle, determine that the mobile vehicle is parked, and determine that the mobile vehicle is parked at a property associated with the home automation system.

Sensor 640 may monitor the mobile vehicle with one or more sensors 640, where detecting the movement of the mobile vehicle is based on data from the one or more sensor 640.

Security manager 645 may receive, from the home automation system, an instruction to arm the home automation system. In some cases, the detected event includes detecting a security breach of the mobile vehicle and the action related to the detected event includes at least one of arming the home automation system or the vehicle or notifying a designated entity (e.g., a user, insurance, or a police entity) of the security breach.

Figure 7:
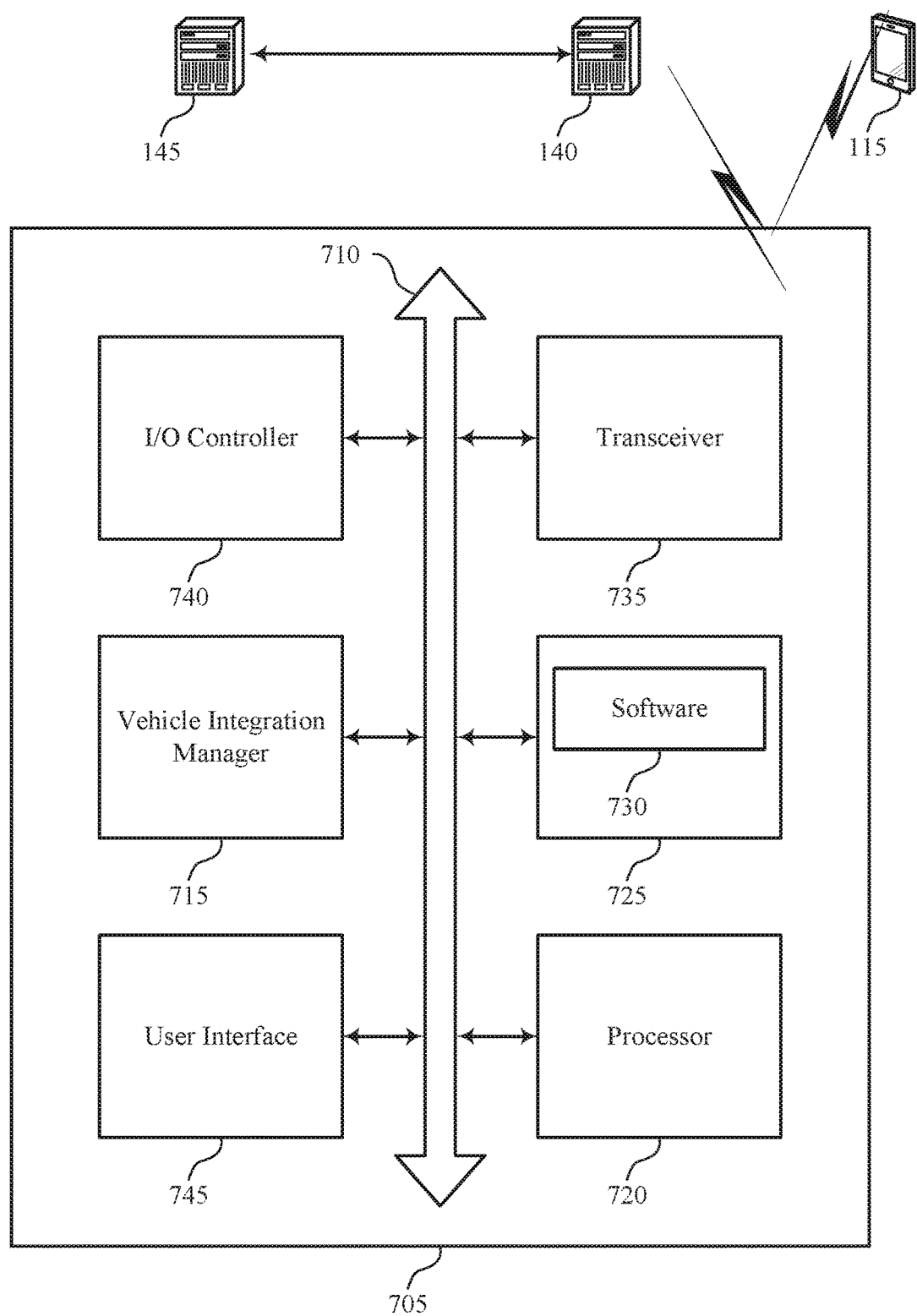
FIG. 7 illustrates a block diagram of a system including a system that supports mobile vehicle integration with a home automation system in accordance with aspects of the present disclosure.

FIG. 7 shows a diagram of a system 700 including a device 705 that supports mobile vehicle integration with a home automation system in accordance with aspects of the present disclosure. Device 705 may be an example of or include the components of device 405, device 505, or a home automation system 100 as described above, e.g., with reference to FIGS. 1, 4, and 5. Device 705 may include components for bi-directional voice and data communications including components for transmitting and receiving communications, including vehicle integration manager 715, processor 720, memory 725, software 730, transceiver 735, I/O controller 740, and user interface 745. These components may be in electronic communication via one or more buses (e.g., bus 710).

In some cases, device 705 may communicate with a remote storage device 140, and/or a remote server 155. For example, one or more elements of device 705 may provide a direct connection to a remote server 155 via a direct network link to the Internet via a POP (point of presence). In some embodiments, one element of device 705 (e.g., one or more antennas, transceivers, etc.) may provide a connection using wireless techniques, including digital cellular telephone connection, Cellular Digital Packet Data (CDPD) connection, digital satellite data connection, and/or another connection.

Many other devices and/or subsystems may be connected to one or may be included as one or more elements of system 700 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 7 need not be present to practice the present systems and methods. The devices and subsystems may also be interconnected in different ways from that shown in FIG. 7. In some embodiments, an aspect of the operations of system 700 may be readily known in the art and are not discussed in detail in this disclosure.

The signals associated with system 700 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or Long Term Evolution (LTE), for example), and/or other signals. The radio access technology (RAT) of system 700 may be related to, but are not limited to, WWAN (GSM, CDMA, and WCDMA), wireless local area network (WLAN) (including BLuser equipment (UE)TOOTH® and Wi-Fi), WMAN (WiMAX), antennas for mobile communications, antennas for Wireless Personal Area Network (WPAN) applications (including radio frequency identification (RFID) and UWB). In some embodiments, one or more sensors (e.g., motion, proximity, smoke, light, glass break, door, window, carbon monoxide, and/or another sensor) may connect to some element of system 700 via a network using the one or more wired and/or wireless connections.

Processor 720 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 720 may be configured to operate a memory array using a memory controller. In other cases, a memory controller may be integrated into processor 720. Processor 720 may be configured to execute computer-readable instructions stored in a memory to perform various functions (e.g., functions or tasks supporting mobile vehicle integration with a home automation system).

Memory 725 may include RAM and ROM. The memory 725 may store computer-readable, computer-executable software 730 including instructions that, when executed, cause the processor to perform various functions described herein. In some cases, the memory 725 may contain, among other things, a basic input/output system (BIOS) which may control basic hardware or software operation such as the interaction with peripheral components or devices.

Software 730 may include code to implement aspects of the present disclosure, including code to support mobile vehicle integration with a home automation system. Software 730 may be stored in a non-transitory computer-readable medium such as system memory or other memory. In some cases, the software 730 may not be directly executable by the processor but may cause a computer (e.g., when compiled and executed) to perform functions described herein.

Transceiver 735 may communicate bi-directionally, via one or more antennas, wired, or wireless links as described above. For example, the transceiver 735 may represent a wireless transceiver and may communicate bi-directionally with another wireless transceiver. The transceiver 735 may also include a modem to modulate the packets and provide the modulated packets to the antennas for transmission, and to demodulate packets received from the antennas.

I/O controller 740 may manage input and output signals for device 705. I/O controller 740 may also manage peripherals not integrated into device 705. In some cases, I/O controller 740 may represent a physical connection or port to an external peripheral. In some cases, I/O controller 740 may utilize an operating system such as iOS®, ANDROID®, MS-DOS®, MS-WINDOWS®, OS/2®, UNIX®, LINUX®, or another known operating system. In other cases, I/O controller 740 may represent or interact with a modem, a keyboard, a mouse, a touchscreen, or a similar device. In some cases, I/O controller 740 may be implemented as part of a processor. In some cases, a user may interact with device 705 via I/O controller 740 or via hardware components controlled by I/O controller 740.

User interface 745 may enable a user to interact with device 705. In some embodiments, the user interface module 745 may include an audio device, such as an external speaker system, an external display device such as a display screen, or an input device (e.g., remote control device interfaced with the user interface module 745 directly or through the I/O controller module).

Figure 8:
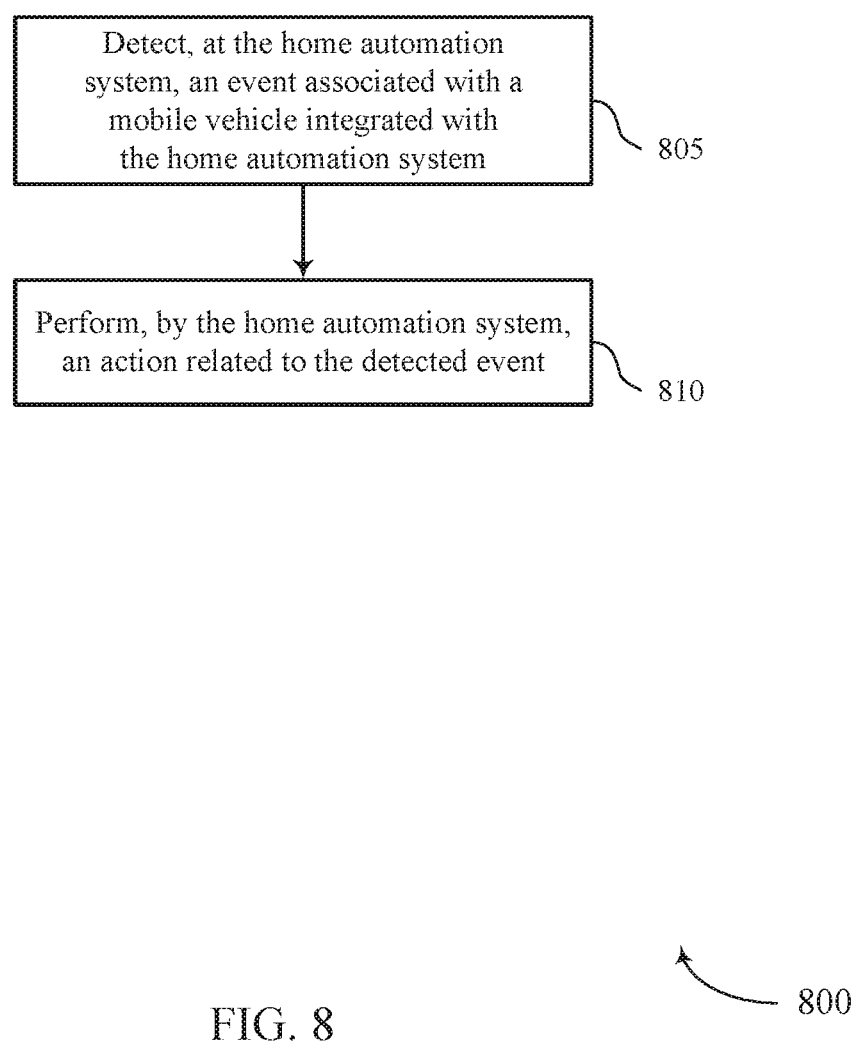
FIGS. 8 through 9 illustrate methods for mobile vehicle integration with a home automation system in accordance with aspects of the present disclosure.

FIG. 8 shows a flowchart illustrating a method 800 for mobile vehicle integration with a home automation system in accordance with aspects of the present disclosure. The operations of method 800 may be implemented by a home automation system or vehicle integration system or their components as described herein. For example, the operations of method 800 may be performed by a vehicle integration manager or a home automation system as described with reference to FIGS. 4 through 7. In some examples, a vehicle integration system may execute a set of codes to control the functional elements of the device to perform the functions described below. Additionally or alternatively, the vehicle integration system may perform aspects of the functions described below using special-purpose hardware.

At 805 the home automation system may detect an event associated with a mobile vehicle integrated with the home automation system. The operations of 805 may be performed according to the methods described herein. In certain examples, aspects of the operations of 805 may be performed by a vehicle integration manager as described with reference to FIGS. 4 through 7.

At 810 the home automation system may perform an action related to the detected event. The operations of 810 may be performed according to the methods described herein. In certain examples, aspects of the operations of 810 may be performed by a home automation system as described with reference to FIGS. 4 through 7.

In some examples, the method 800 includes providing a notification to a device associated with the home automation system regarding at least one of the event or the action performed. The method 800 may include receiving data from one or more sensors onboard the mobile vehicle and analyzing the data from the one or more sensors to determine the event has occurred. Action performed in response to the event may include changing a setting of one or more devices onboard the mobile vehicle In another example, the method 800 may include determining a current location of the mobile vehicle. From the current location of the mobile vehicle the method 800 may determine that the mobile vehicle is approaching a property associated with the home automation system. Based on this, the home automation system may adjust one or more aspects of the home automation system based on the determination that the mobile vehicle is approaching the property. Similarly, from the current location of the mobile vehicle, the method 800 may determine that the mobile vehicle is leaving a property associated with the home automation system. The home automation system may adjust one or more aspects of the home automation system based on the determination that the mobile vehicle is approaching the property.

The method 800 may include determining that the mobile vehicle is parked at a property associated with the home automation system. The method 800 may include the home automation system monitoring the mobile vehicle with one or more sensors of the home automation system. In some examples, detecting movement of the mobile vehicle is based on data from the one or more sensors. The method 800 may include predicting a cause of the movement from the detected movement of the mobile vehicle and providing a notification indicating the predicted cause of the movement. Example causes of movement may be an accident, a minor bumping, a person pushing on the vehicle, wind, the vehicle being towed, etc.

The method 800 may further include receiving, at the home automation system, an indication of the event from the mobile vehicle. The method 800 may also include receiving, at the home automation system, a request for the mobile vehicle to be locked or unlocked, wherein the event comprises the receiving the request. In such an example, the action related to the detected event includes locking or unlocking the mobile vehicle according to the request.

In some examples of the method 800, the detected event comprises detecting a security breach of the mobile vehicle. The action related to the detected event comprises at least one of arming the home automation system or notifying a designated entity of the security breach.

The method 800 may also include receiving, at the home automation system, an instruction to arm the home automation system and arming a security system of the mobile vehicle.

In some examples, the method 800 includes determining that an interior of the vehicle has a temperature above a high threshold level or below a low threshold level. The method 800 may include detecting an occupancy of a car, such as detecting a child or pet within the car. The method 800 may detect the child or pet based on information such as ID tags, cameras, weight sensors, or the like. If the temperature of the interior of the vehicle is outside an acceptable temperature range, the method 800 may provide a notification to the home automation system or a mobile device associated with the home automation system. In one example, the home automation system may instruct one or more systems of the vehicle to open or close a window of the vehicle or change a status of a heating system of the vehicle. For example, if the temperature of the vehicle is too hot and a child is present in the vehicle, the home automation system may instruct the vehicle to roll down a window or engage an air conditioner.

Figure 9:
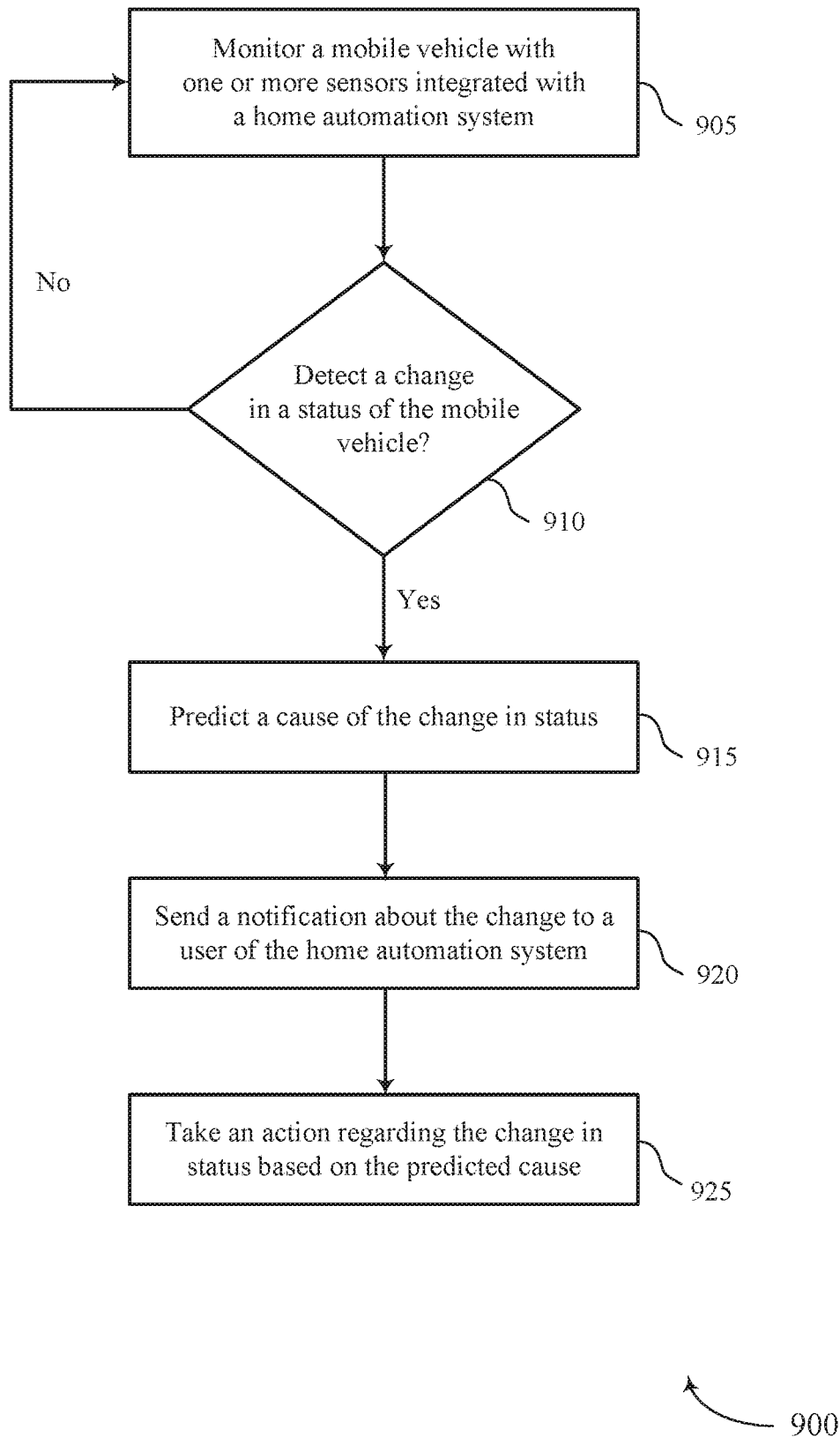

FIG. 9 shows a flowchart illustrating a method 900 for mobile vehicle integration with a home automation system in accordance with aspects of the present disclosure. The operations of method 900 may be implemented by a home automation system or vehicle integration system or their components as described herein. For example, the operations of method 900 may be performed by a vehicle integration manager or a home automation system as described with reference to FIGS. 4 through 7. In some examples, a vehicle integration system may execute a set of codes to control the functional elements of the device to perform the functions described below. Additionally or alternatively, the vehicle integration system may perform aspects of the functions described below using special-purpose hardware.

The method 900 may include monitoring a mobile vehicle with one or more sensors integrated a home automation system at block 905. The one or more sensors may be part of a premises or located onboard the mobile vehicle. The method 900 may include detecting a change in a status of the mobile vehicle at block 910. For example, changes may include the mobile vehicle is suddenly moved, a voltage of the battery drops or spikes, a temperature of the mobile vehicle changes, glass of the mobile vehicle is broken, a security system of the mobile vehicle is tripped, or the like. If a change not detected, the method 900 continues to monitor the mobile vehicle at block 905.

However, if a change is detected, the method 900 includes predicting a cause of the change in status at block 915. The cause of the change in status may be predicted from pattern recognition and machine learning, from processing sensor data, from input from a user, from comparing sensor data with threshold levels, or the like. For example, if the vehicle is suddenly moved without the vehicle being self-powered (e.g., the vehicle is not being driven), and the camera detects a large vehicle with a towing equipment proximate to the vehicle, the home automation system may predict that the vehicle is being towed. In another example, if the home automation system determines that the vehicle moved with an acceleration greater than a threshold, the home automation system may predict that the vehicle was in an accident. Other examples are contemplated herein.

At block 920, the method 900 includes sending a notification about the change of status to a user of the home automation system. The notification may be provided to a mobile device of the user, to a control panel of the home automation system, or to a control panel of the vehicle, for example.

The method 900 includes performing an action regarding the change in status based on the predicted cause at block 925. For example, the action may be opening or closing a window or engaging a heating and cooling system of the vehicle. In the example where an acceleration above a threshold level has been detected, and an accident is predicted, the home automation system may call an ambulance and instruct it to go to a current location of the vehicle. In an example where the vehicle is being towed, the home automation system may imitate a phone call at the user's mobile phone with the likely tow truck company or with an alternate ride (e.g., friend or relative, taxi service, etc.).

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration. An operating system utilized by the processor (or by I/O controller module or another module described above) may be iOS®, ANDROID®, MS-DOS®, MS-WINDOWS®, OS/2®, UNIX®, LINUX®, or another known operating system.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for mobile vehicle integration with a home automation system, comprising:
   detecting, at the home automation system, an event associated with a mobile vehicle integrated with the home automation system;
   determining that the mobile vehicle is approaching a property associated with the home automation system based at least in part on the detecting;
   performing, by the home automation system, an action related to the detected event, wherein the action comprises deactivating an alarm system of the home automation system based on the determination that the mobile vehicle is approaching the property;
   detecting a security breach of the mobile vehicle after deactivating the alarm system of the home automation system; and
   performing, by the home automation system, an action related to the security breach based at least in part on detecting the security breach of the mobile vehicle, the action comprising arming the home automation system and notifying a designated entity.

2. The method of claim 1, further comprising:
   providing, by the home automation system, a notification to a device associated with the home automation system regarding at least one of the event or the action performed.

3. The method of claim 1, further comprising:
   determining a current location of the mobile vehicle, wherein the event is the determination that the mobile vehicle is approaching the property, and wherein the action comprises adjusting one or more aspects of the home automation system based on the determination that the mobile vehicle is approaching the property.

4. The method of claim 1, further comprising:
   determining a current location of the mobile vehicle; and
   determining, from the current location of the mobile vehicle, that the mobile vehicle is outside a threshold distance from the property associated with the home automation system, and wherein the action comprises setting the home automation system to an away mode based on the determination that the mobile vehicle is outside the threshold distance from the property.

5. The method of claim 1, further comprising:
   determining that the mobile vehicle is parked; and
   detecting a movement of the mobile vehicle while it is parked, wherein the event is the movement of the mobile vehicle, and wherein the action comprises providing a notification to a device associated with the home automation system that the mobile vehicle has moved.

6. The method of claim 5, further comprising:
   determining that the mobile vehicle is parked at the property associated with the home automation system; and
   monitoring the mobile vehicle with one or more sensors of the home automation system, wherein detecting the movement of the mobile vehicle is based on data from the one or more sensors.

7. The method of claim 5, further comprising:
   predicting a cause of the movement from the detected movement of the mobile vehicle; and
   providing a notification indicating the predicted cause of the movement.

8. The method of claim 1, further comprising:
   receiving, at the home automation system, an indication of the event from the mobile vehicle.

9. The method of claim 1, further comprising:
   receiving, at the home automation system, a request for the mobile vehicle to be locked or unlocked, wherein the event comprises receiving the request, and wherein the action comprises locking or unlocking the mobile vehicle according to the request.

10. The method of claim 1, further comprising:
    receiving, at the home automation system, an instruction to arm the home automation system, wherein the event associated with the mobile vehicle comprises the instruction to arm the home automation system, and wherein the action comprises arming a security system of the mobile vehicle.

11. The method of claim 1, further comprising:
    receiving data from one or more sensors onboard the mobile vehicle; and
    analyzing the data from the one or more sensors to determine the event has occurred.

12. An apparatus for mobile vehicle integration with a home automation system, comprising:
    a processor;
    memory in electronic communication with the processor; and
    instructions stored in the memory and executable by the processor to cause the apparatus to:
      detect, at the home automation system, an event associated with a mobile vehicle integrated with the home automation system;
      determine that the mobile vehicle is approaching a property associated with the home automation system based at least in part on the detecting;
      perform, by the home automation system, an action related to the detected event, wherein the action comprises deactivating an alarm system of the home automation system based on the determination that the mobile vehicle is approaching the property;

detect a security breach of the mobile vehicle after deactivating the alarm system of the home automation system; and perform, by the home automation system, an action related to the security breach based at least in part on detecting the security breach of the mobile vehicle, the action comprising arming the home automation system and notifying a designated entity.

13. The apparatus of claim 12, wherein the instructions are further executable by the processor to cause the apparatus to:

provide, by the home automation system, a notification to a device associated with the home automation system regarding at least one of the event or the action performed.

14. The apparatus of claim 12, wherein the instructions are further executable by the processor to cause the apparatus to:

determine a current location of the mobile vehicle, wherein the event is the determination that the mobile vehicle is approaching the property, and wherein the action comprises adjusting one or more aspects of the home automation system based on the determination that the mobile vehicle is approaching the property.

15. The apparatus of claim 12, wherein the instructions are further executable by the processor to cause the apparatus to:

determine a current location of the mobile vehicle; and determine, from the current location of the mobile vehicle, that the mobile vehicle is outside a threshold distance from the property associated with the home automation system, and wherein the action comprises setting the home automation system to an away mode based on the determination that the mobile vehicle is outside the threshold distance from the property.

16. The apparatus of claim 12, wherein the instructions are further executable by the processor to cause the apparatus to:

receive, at the home automation system, an indication of the event from the mobile vehicle.

17. The apparatus of claim 12, wherein the instructions are further executable by the processor to cause the apparatus to:

receive data from one or more sensors onboard the mobile vehicle; and analyze the data from the one or more sensors to determine the event has occurred.

18. A non-transitory computer-readable medium storing code for mobile vehicle integration with a home automation system, the code comprising instructions executable by a processor to:

detect, at the home automation system, an event associated with a mobile vehicle integrated with the home automation system;

determine that the mobile vehicle is approaching a property associated with the home automation system based at least in part on detection;

perform, by the home automation system, an action related to the detected event, wherein the action comprises deactivating an alarm system of the home automation system based on the determination that the mobile vehicle is approaching the property;

detect a security breach of the mobile vehicle after deactivating the alarm system of the home automation system; and perform, by the home automation system, an action related to the security breach based at least in part on detecting the security breach of the mobile vehicle, the action comprising arming the home automation system and notifying a designated entity.

* * * * *